United States Patent

[11] 3,528,356

| [72] | Inventor | John H. Eagle |
| | | Rochester, New York |
| [21] | Appl. No. | 575,056 |
| [22] | Filed | Aug. 25, 1966 |
| [45] | Patented | Sept. 15, 1970 |
| [73] | Assignee | Eastman Kodak Company |
| | | Rochester, New York |
| | | a corporation of New Jersey |

[54] PHOTOGRAPHIC CAMERA AND CARTRIDGE
13 Claims, 5 Drawing Figs.

[52] U.S. Cl. .................................. 95/31, 352/222

[51] Int. Cl. .................................. G03b 1/52, G03b 17/28

[50] Field of Search .................................. 352/222; 88/24, 32; 95/31, 12.5; 355/73, 76

[56] References Cited
UNITED STATES PATENTS

| 1,082,678 | 12/1913 | Casler | 352/222 |
| 1,181,202 | 5/1916 | Akeley | 352/222 |
| 1,231,360 | 6/1917 | Howell | 352/222 |
| 1,309,798 | 7/1919 | Folmer | 352/222 |
| 2,218,245 | 10/1940 | Lindenberg | 95/31 |
| 2,788,724 | 4/1957 | Weiss | 95/31 |
| 3,157,101 | 11/1964 | Rabinow | 95/31 |
| 2,283,788 | 5/1942 | Briechle et al. | 95/12.5 |
| 2,596,222 | 5/1952 | Doyle et al. | 95/12.5 |
| 3,138,084 | 6/1964 | Harvey | 95/31 |

Primary Examiner—Norton Ansher
Assistant Examiner—Joseph F. Peters, Jr.
Attorneys—Robert W. Hampton and Thomas R. Lampe ABSTRACT: A camera includes a vacuum source with a vacuum-present indicator and a conduit interconnecting the source and a film cartridge receivable in the camera. The cartridge contains paper-backed film and a planar film support surface having open channels for transmitting the vacuum over the support surface. The backing paper has holes therethrough to transmit the vacuum from the support surface to the film.

Patented Sept. 15, 1970

3,528,356

JOHN H. EAGLE
INVENTOR.

BY *Thomas R Lamper*
*Robert W Hampton*

ATTORNEYS

Patented Sept. 15, 1970

JOHN H. EAGLE
INVENTOR.

BY Thomas R. Lampe
Robert W. Hampton
ATTORNEYS

PHOTOGRAPHIC CAMERA AND CARTRIDGE

This invention relates to a photographic camera, and especially to a camera of the cartridge-loaded type, intended for use with conventional paper-backed film.

A rather recent development in the photographic industry has been the increasing popularity of cameras which utilize factory-loaded cartridges. One cartridge of this type is disclosed in U.S. Pat. No. 3,138,081, granted June 23, 1964 to H. Nerwin. As is more fully disclosed in the aforesaid patent, a roll of film is disposed in a cartridge or magazine and selectively positioned with respect to the camera objective lens. During such selective positioning of the film, it passes over a flat, rectangular surface which is an integral part of the cartridge and which serves to support the film in a flat focal plane. To insure the proper positioning of film in the cartridge disclosed in the above patent, it is necessary to maintain accurate tolerances with respect to the dimensions of the elements of the cartridge. This is necessary since the film and associated backing paper are maintained in engagement with the supporting surface by a rectangular rearwardly facing surface on the cartridge which must be accurately positioned with respect to such supporting surface to allow the film and backing paper to pass therebetween while at the same time maintaining such engagement.

An object of this invention is to provide a film flattening or positioning means for use with cartridge-loaded cameras, such means utilizing a vacuum arrangement for flattening the film against the focal plane support surface of an associated cartridge.

The above objective is attained in the present invention in a film cartridge which is so constructed as to be in communication with a vacuum source on an associated camera, such vacuum source being employed to flatten or position the film in the cartridge against the focal plane support surface of such cartridge.

Other objects of the invention will appear from the following description, reference being made to the accompanying drawings wherein.

Figure 1:
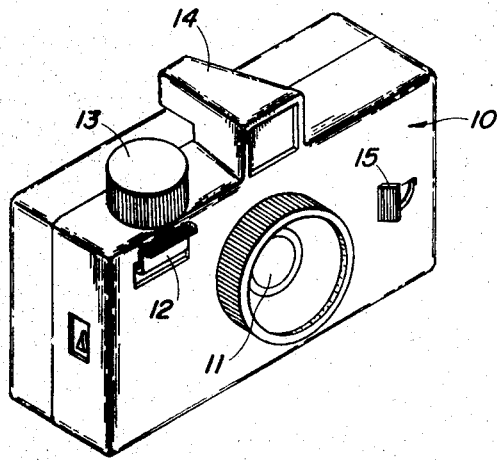
FIG. 1 is an isometric view of a photographic camera incorporating the elements of the invention disclosed herein.

Referring now to FIG. 1, a photographic camera 10 is shown having an objective lens 11 and a shutter release lever 12 which actuates the camera shutter mechanism (not shown) through any known linkage means. A winding knob 13 is used by the operator to advance the film (not shown) in a conventional manner. A viewfinder 14 is mounted on top of the camera and is used by the operator to compose the scene for purposes of taking a photograph in the usual manner. It is to be understood that other types of viewfinders could be used, such as a "through-the-lens" type. Also illustrated in FIG. 1 is a curved actuating lever 15 which projects from the front face plate of the camera. The operation of lever 15 will be more fully disclosed below.

Figure 2:
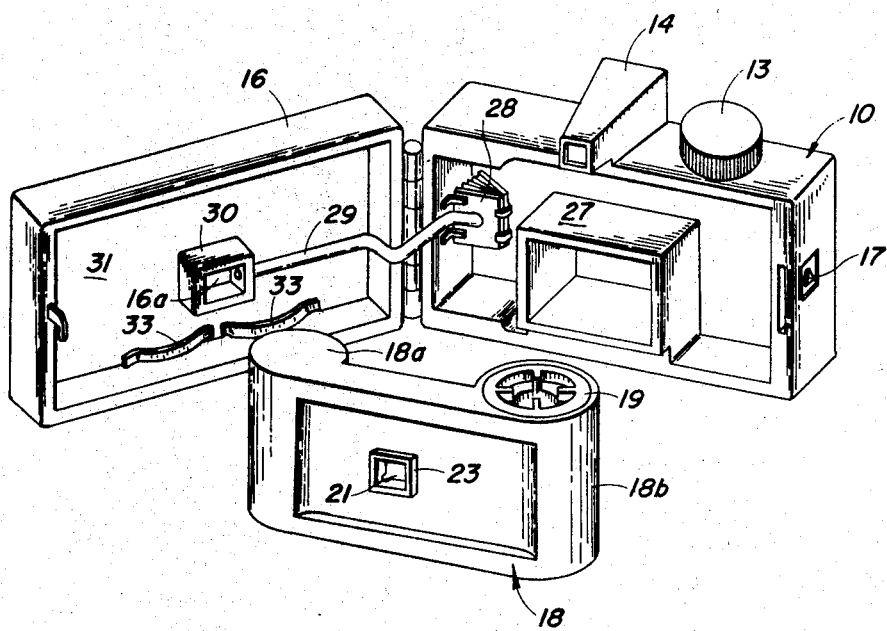
FIG. 2 is a perspective rear view of the embodiment of the system illustrated in FIG. 1 showing a cartridge in position for insertion in the camera.
Figure 3:
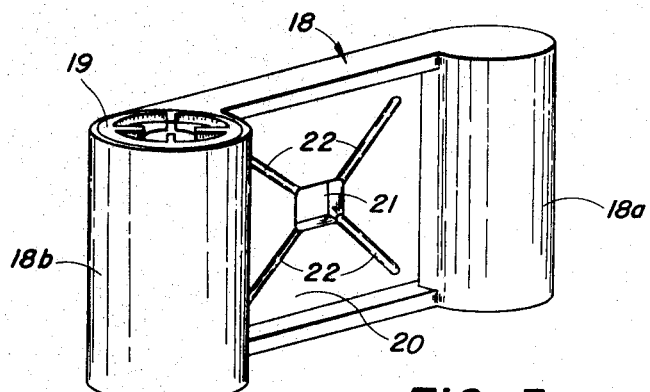
FIG. 3 is an isometric view of the film cartridge incorporating elements of the present invention.

As may be seen with particular reference to FIG. 2, camera 10 has a hinged cover member 16 which may be released by means of latch member 17 and moved to the position illustrated. A transparent window 16a constructed of transparent plastic or glass is embedded in cover member 16 in the manner shown. When cover member 16 is in this position, a film cartridge 18 may be inserted into the camera. A cartridge of this type is more fully disclosed in the above-mentioned U.S. Pat No. 3,138,081, granted June 23, 1964 to H. Nerwin. As is more fully disclosed in the aforesaid patent, and may be seen with particular reference to FIGS. 2 and 3, a roll of film (not shown) is disposed in the cartridge in a film supply chamber 18a and such film is selectively positioned with respect to the camera objective lens by being rewound on spool 19 by means of winding knob 13. It is of course understood that spool 19 is disposed for rotatable movement in receiving chamber 18b and that the film, as it is being wound onto the spool, passes over the flat, rectangular focal plane support surface 20 which serves to support the film in a flat plane as it moves thereacross.

As with the cartridge disclosed in the aforesaid patent, cartridge 18 has a substantially rectangularly-shaped aperture 21 formed in the back portion thereof in the manner shown. This aperture is utilized to present to the view of the operator through window 16a the number of unexposed frames remaining on the film. This is usually represented by suitable indicia on the backing paper which are aligned with aperture 21 as the film and backing paper move across the rectangular support 20. Cartridge 18 differs from that disclosed in the aforementioned patent in two main respects.

Figure 4:
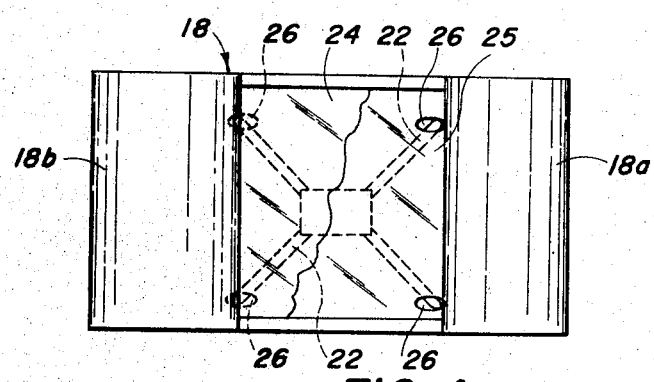
FIG. 4 is a slightly enlarged frontal view of the film cartridge according to this invention illustrating the operational relationship of the film, the film backing paper and the cartridge focal plane support surface during the operation of the device.

In film cartridge 18 a series of channels 22 are formed in the support surface 20 which communicate with aperture 21 in the manner shown. Although in the present embodiment channels 22 are formed in support surface 20 in such a manner as to form an X-shaped design on the plate, they could be disposed therein in any desired configuration. Film cartridge 18 further differs from that disclosed in the aforementioned patent in that a substantially rectangularly shaped projection 23 is formed on the back side of film cartridge 18, the internal dimensions thereof corresponding to the dimensions of rectangularly shaped aperture 21 (see FIG. 2). As may most readily be seen with reference to FIG. 4, film cartridge 18 is adapted to accommodate film 24 and the usual associated backing paper 25. In FIG. 4, the film is shown partially broken away to illustrate the fact that backing paper 25 has a plurality of slots 26 formed therein, the purpose of which will be more fully brought out below.

Referring once again to FIG. 2, the main housing of camera 10 is provided with a central box-like member 27, the internal dimensions of which correspond to that of cartridge focal plane support surface 20. Disposed adjacent box-like member 27 and fixedly attached to the housing of camera 10 in any known manner, is a bellows pump 28, the operation of which will be more fully described below. Extending from bellows pump 28 in the manner shown is a flexible hollow tube element 29 which in turn communicates at its other end with the interior of a rectangularly shaped seal member 30 projecting from back cover wall 31 of the camera cover member 16. The internal dimensions of seal member 30 are somewhat less than the external dimensions of rectangularly shaped projection 23 which is formed on film cartridge 18. Seal member 30 may be constructed of rubber or any other suitable yieldable seal material.

In operation, upon the insertion of the cartridge 18 in the camera and the closing of hinged cover member 16 in a manner which is more fully disclosed in aforementioned U.S. Pat. No. 3,138,081, spring elements 33 connected to said cover member bias the cartridge toward the front of the camera. The camera housing and cartridge are dimensioned so that support surface 20 is directly in line with the inner chamber of box-like member 27 so that the back plate is optically aligned with objective lens 11 communicating with box-like member 27 and so that the support surface 20 lies substantially coincident with the camera focal plane.

Figure 5:
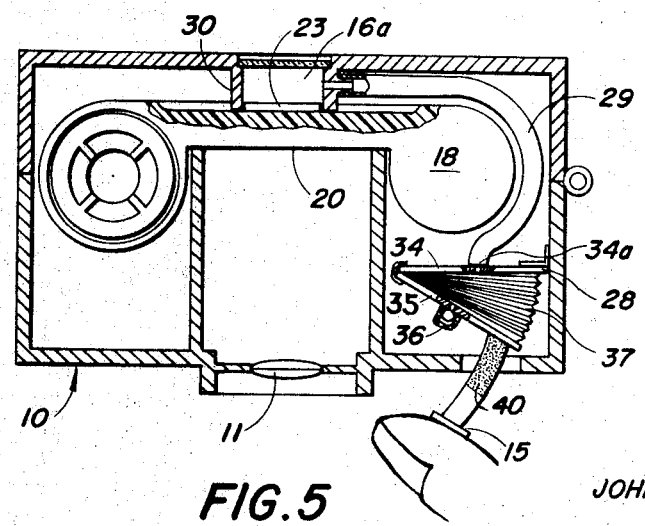
FIG. 5 illustrates in schematic fashion the operation of the present invention.

The positions assumed by the various elements of this device are shown most clearly with reference to FIG. 5. Upon the closing of cover member 16, rectangularly shaped seal member 30 is forced over projection 23 in the manner shown to form a substantially air-tight seal between these two elements. In this manner, aperture 21 and channels 22 of the cartridge 18 are brought into communication with bellows pump 28 through hollow tube element 29.

As may be seen with reference to FIG. 5, bellows pump 28 is of a simple construction, utilizing a fixed plate 34 having an aperture 34a therein which communicates with hollow tube element 29. Hingedly attached to fixed plate 34 is hinged plate 35 and integral curved actuating lever 15 which projects from the front of camera 10. A simple ball check valve 36 is associated with hinged plate 35 in the manner illustrated. Plates 34 and 35 are connected in the customary fashion by an accordion-type bellows 37 and the plates are normally biased away from one another by any suitable spring means (not shown).

Assuming that the film and associated backing paper have been properly indexed to the position illustrated in FIG. 4, such indexing being accomplished through any suitable mechanical means or manually by the operator through observation of any suitable indicia through window 16a, slots 26 in the backing paper register with channels 22 in cartridge 18 in the manner shown. Upon depression of curved actuating lever 15 by the operator and the subsequent release thereof, a vacuum will be created by bellows pump 28 in an obvious manner, such vacuum being transmitted through hollow tube element 29, through rectangularly shaped aperture 21, through channels 22, and through slots 26 in the backing paper, thereby exerting a partial vacuum over substantially the full expanse of film 24 which is in registry with box-like member 27. The partial vacuum and the consequent flattening of the film is of course not permanent. However, in practice it will last for several seconds, thus holding the film against support surface 20 an ample time to make an exposure. In the present embodiment, the operator could determine if a vacuum is being exerted on the film through an appropriate signal device. In this instance, curved actuating lever 15 has a painted section 40 thereon which normally projects from the camera face plate when no vacuum is being exerted but which is held inside the camera by bellows pump 28 when a vacuum has been created and is being continuously applied to cartridge 18.

It will thus be seen that with the cartridge according to the present invention, close critical tolerances need be maintained only to the extent that the cartridge is accurately positioned in the camera and the film support surface is accurately positioned with respect to the focal plane of the camera lens system since the flattening of the film is effected by means other than an element of the cartridge itself.

Having described the general form of the present invention, it should be understood that the forms illustrated herein have been selected to facilitate the disclosure of the invention rather than to limit the number of forms which it may assume, and various modifications, adaptations and alterations may be applied to the forms shown to meet the requirements of practice without departing from the spirit or scope of the present invention. For example, it is not necessary to use the expanding bellows pump shown. Any other vacuum producing means may be utilized to equal advantage. In addition, actuation of the vacuum producing means could be related to the shutter release mechanism and may be operated either by finger pressure on the shutter release or by an auxiliary motor arrangement that would be released just prior to the tripping of the shutter.

I claim:
1. In combination:
   a. a photographic camera;
   b. a film cartridge within said camera, said cartridge comprising a film supply compartment, a film take-up compartment, and a wall connecting said compartments, said wall having:
      a forward portion defining a film support for supporting film as said film is positioned for exposure, and an air passageway extending from said forward portion through said wall;
   c. vacuum producing means in said camera;
   d. and means interconnecting said vacuum producing means with said air passageway whereby actuation of said vacuum producing means creates a partial vacuum to substantially flatten said film agains said film support.

2. The combination according to claim 1 wherein said interconnecting means includes conduit means leading from said vacuum producing means and operatively associated with said cartridge.

3. The combination according to claim 1 wherein said film support includes a plurality of open faced channels, said channels being operatively associated with said interconnecting means to distribute the partial vacuum created by said vacuum producing means substantially over the full extent of said film support.

4. The combination according to claim 1 wherein said vacuum producing means comprises a manually actuated bellows pump disposed in the housing of said camera.

5. The combination according to claim 1 wherein said interconnecting means and said air passageway are interconnected by seal means.

6. A film cartridge receivable in a photographic camera, said cartridge comprising:
   a. a supply chamber;
   b. a receiving chamber; and
   c. a wall connecting said chambers, said wall having:
      a forward portion for defining a film support between said chambers, and air passageway means extending from said film support for providing for the application of a vacuum over at least a portion of said film support to maintain film in a substantially flat plane on said film support.

7. The cartridge according to claim 6 wherein said air passageway means comprises a plurality of outwardly facing channels on said film support, and an aperture through said wall, said channels communicating with said aperture to transmit a vacuum applied through said aperture to said channels.

8. In combination:
   a. a film cartridge including a supply chamber, a receiving chamber and film support means disposed between said chambers and including channel means;
   b. photographic film adapted to move between said supply chamber and said receiving chamber across said film support means to be positioned thereon for the purpose of taking a photograph; and
   c. backing paper operatively associated with said film and adapted to be moved across said film support means with said film, said backing paper having slot means therein; said slot means being registrable with said channel means when said film is positioned for purposes of taking a photograph.

9. The combination according to claim 8 wherein said film support means has aperture means therein communicating with said channel means.

10. In a camera having a chamber for receiving a removable film cartridge, which cartridge includes a film supply compartment, a film take-up compartment, and a wall connecting the compartments and having a forward portion defining a film support, the improvement comprising:
   a. vacuum producing means;
   b. conduit means having one end thereof leading from said vacuum producing means for transmitting vacuum therefrom; and
   c. means engageable with a cartridge upon insertion of the cartridge in the camera; said engageable means being connected to the other end of said conduit means whereby a vacuum produced by said vacuum producing means is transmitted to the cartridge for the purpose of substantially flattening the film therein against the cartridge film support.

11. A camera according to claim 10 wherein said vacuum producing means has associated therewith a manually operable member projecting through the face plate of said camera.

12. A camera according to claim 10 wherein said vacuum producing means has signal means associated therewith to indicate to the operator when a vacuum is being produced by said vacuum producing means.

13. Apparatus for making photographic exposures, said apparatus comprising:
   a. a photographic camera;

b. a film cartridge including a supply compartment, a take-up compartment, and a wall connecting said compartments, said wall:
  1. having a forward portion defining a film support, on which support film can be positioned and exposed; and
  2. air passageway means extending through said wall from said forward portion;
c. photographic film transportable from said supply compartment, across said film support, to said take-up compartment;
d. backing paper operatively associated with said film and transportable across said film support with said film, said backing paper having aperture means registrable with said air passageway means when said film is positioned for exposure on said film support;
e. vacuum producing means in said camera; and
f. means interconnecting said vacuum producing means with said air passageway for transmitting air from between said film and said forward portion in response to actuation of said vacuum producing means, to substantially flatten said film against said film support.